(12) United States Patent
Parkinson et al.

(10) Patent No.: US 8,639,655 B2
(45) Date of Patent: Jan. 28, 2014

(54) DEDICATING THREADS TO CLASSES OF LDAP SERVICE

(75) Inventors: Steven W. Parkinson, San Jose, CA (US); Nathan G. Kinder, Castro Valley, CA (US)

(73) Assignee: Red Hat, Inc., Raleigh, NC (US)

( * ) Notice: Subject to any disclaimer, the term of this patent is extended or adjusted under 35 U.S.C. 154(b) by 436 days.

(21) Appl. No.: 11/514,816

(22) Filed: Aug. 31, 2006

(65) Prior Publication Data

US 2008/0059499 A1 Mar. 6, 2008

(51) Int. Cl.
*G06F 7/00* (2006.01)
*G06F 17/00* (2006.01)

(52) U.S. Cl.
USPC ........... 707/607; 707/608; 707/609; 707/705; 709/217; 709/218; 709/219; 709/227; 709/230

(58) Field of Classification Search
USPC ................. 707/101, 600, 607, 608, 609, 705, 707/999.101; 709/203, 217, 218, 219, 227, 709/230
See application file for complete search history.

(56) References Cited

U.S. PATENT DOCUMENTS

| | | | |
|---|---|---|---|
| 5,860,003 A | | 1/1999 | Eidler et al. |
| 6,073,175 A | * | 6/2000 | Tavs et al. .................. 709/226 |
| 6,304,906 B1 | * | 10/2001 | Bhatti et al. ................. 709/227 |
| 6,430,561 B1 | * | 8/2002 | Austel et al. ..................... 707/1 |
| 6,463,470 B1 | | 10/2002 | Mohaban et al. |
| 6,466,984 B1 | | 10/2002 | Naveh et al. |
| 6,553,368 B2 | | 4/2003 | Martin et al. |
| 6,609,121 B1 | | 8/2003 | Ambrosini et al. |
| 6,622,170 B1 | | 9/2003 | Harrison et al. |
| 6,633,872 B2 | * | 10/2003 | Ambrosini et al. ............... 707/9 |
| 6,654,891 B1 | | 11/2003 | Borsato et al. |
| 6,665,674 B1 | * | 12/2003 | Buchanan et al. .............. 707/10 |
| 6,732,160 B2 | | 5/2004 | Ambrosini et al. |
| 6,785,686 B2 | * | 8/2004 | Boreham et al. .............. 707/102 |
| 6,850,928 B1 | * | 2/2005 | McClure et al. ................... 707/3 |
| 7,020,662 B2 | | 3/2006 | Boreham et al. |
| 7,039,914 B2 | | 5/2006 | Potter, Jr. |
| 7,058,717 B2 | | 6/2006 | Chao et al. |
| 7,089,294 B1 | * | 8/2006 | Baskey et al. .................. 709/219 |
| 7,493,419 B2 | * | 2/2009 | Moilanen .......................... 710/6 |
| 7,548,989 B2 | | 6/2009 | Alexander, III et al. |
| 7,657,501 B1 | * | 2/2010 | Brown et al. .......... 707/999.002 |
| 2001/0027445 A1 | | 10/2001 | Eichelsdoerfer et al. |
| 2002/0032775 A1 | * | 3/2002 | Venkataramaiah et al. .. 709/225 |

(Continued)

FOREIGN PATENT DOCUMENTS

EP 1-310-856 A2 * 5/2003

OTHER PUBLICATIONS

Howes, Timothy A., et al., Understanding and Deploying LDAP Directory Services, MacMillan Technical Publishing, ISBN 1-57870-070-1, © 1999, pp. 344-362.*

(Continued)

*Primary Examiner* — Hares Jami
(74) *Attorney, Agent, or Firm* — Lowenstein Sandler LLP (57) ABSTRACT

Improved Lightweight Directory Access Protocol ("LDAP") server architectures using dedicated threads to respond to different classes of LDAP requests are described and claimed. Some servers classify an LDAP request from a client, then store the classified request with similarly-classified requests. One of the classified LDAP requests is selected and executed to prepare a corresponding LDAP response. Other arrangements are also described and claimed.

20 Claims, 4 Drawing Sheets

(56) References Cited

U.S. PATENT DOCUMENTS

| | | | |
|---|---|---|---|
| 2002/0078028 A1* | 6/2002 | Lisanke | 707/1 |
| 2002/0087718 A1* | 7/2002 | Hill et al. | 709/237 |
| 2003/0110246 A1* | 6/2003 | Byrne et al. | 709/223 |
| 2003/0182464 A1 | 9/2003 | Hamilton et al. | |
| 2003/0195962 A1* | 10/2003 | Kikuchi et al. | 709/226 |
| 2004/0054808 A1* | 3/2004 | Ekberg | 709/245 |
| 2004/0117350 A1* | 6/2004 | Cavage et al. | 707/2 |
| 2005/0015763 A1* | 1/2005 | Alexander et al. | 718/100 |
| 2005/0021661 A1* | 1/2005 | Duloutre et al. | 709/217 |
| 2006/0004995 A1* | 1/2006 | Hetherington et al. | 712/235 |
| 2006/0006222 A1* | 1/2006 | Brey et al. | 235/379 |
| 2006/0031185 A1* | 2/2006 | Jose et al. | 707/1 |
| 2006/0149748 A1* | 7/2006 | Yamakawa et al. | 707/10 |
| 2006/0271544 A1* | 11/2006 | Devarakonda et al. | 707/9 |
| 2007/0050331 A1* | 3/2007 | Bauman et al. | 707/3 |
| 2007/0294388 A1* | 12/2007 | Yu | 709/224 |

OTHER PUBLICATIONS

Thompson, Dan, "Understanding LDAP", Microsoft Corp. White Paper, Redmond, WA, © 2000, pp. i-iv and 1-109.*

Fink, Josef, et al., "User Modeling for Personalized City Tours", Artificial Intelligence Review, vol. 18, No. 1, Sep. 2002, pp. 33-74.*

Bin, Zeng, et al., "A Model of Scalable Distributed Network Performance Management," ISPN '04 May 10-12, 2004 pp. 607-612.

Guo, Hong, et al, "Research and Design on Distributed Information Integrated Model Bases on LDAP and Intelligent Agent," Proc. of the 8th International Conf. on Computer Supported Cooperative Work in Design, vol. May 26-28, 2004, pp. 319-323.

Mehra, Ashish, et al., "Policy-Based Diffserv on Internet Servers: The AIX Approach," IEEE Internet Computing, vol. 4, Issue 5, Sep./Oct. 2000 pp. 70-80.

Microsoft Computer Dictionary, 5th Edition, Microsoft Press, Redmond, WA © 2002, pp. 433.

Zeilenga, Kurt, D., "Lightweight Directory Access Protocol (LDAP) Technical Specification Road Map," Network Working Group RFC4510, Jun. 2006, pp. 1-8.

Red Hat Office Action for U.S. Appl. No. 11/514,823 (P012) mailed Jun. 23, 2008.

Red Hat Office Action for U.S. Appl. No. 11/514,823 (P012) mailed Mar. 5, 2009.

Red Hat Office Action for U.S. Appl. No. 11/514,823 (P012) mailed Aug. 19, 2009.

Red Hat Notice of Allowance for U.S. Appl. No. 11/514,823 (P012) mailed Aug. 19, 2009.

* cited by examiner

DEDICATING THREADS TO CLASSES OF LDAP SERVICE

FIELD

The invention relates to improving performance of database query operations. More specifically, the invention relates to establishing a plurality of service classes for Lightweight Directory Access Protocol ("LDAP") requests.

BACKGROUND

The Lightweight Directory Access Protocol ("LDAP") is a standard computer networking protocol for querying and modifying entries in a database. The basic protocol is defined in a group of Internet Engineering Task Force ("IETF") Request for Comments ("RFC") documents; various aspects of the current version of the protocol (version 3) are described in RFCs listed in the "LDAP Technical Specification Road Map" (RFC4510, published June 2006). The databases reachable through LDAP may contain any sort of data, but most commonly contain identity and contact information for people and organizations.

LDAP may be viewed as a communication framework within which a client and server establish and conduct a conversation. The client issues one or more requests, and the server responds with a similar number of replies. The client generally need not wait for a response to one request before sending another request, and the server is generally not required to respond to multiple outstanding requests in the same order they were issued. Many LDAP requests can be answered very quickly, but some requests can cause the server to dedicate large amounts of memory or many computing cycles to prepare a response.

Since LDAP servers are often deployed in high-traffic applications where they frequently face significant request volumes, it is important that the server's design address high-load and overload scenarios so that server performance degrades predictably.

BRIEF DESCRIPTION OF DRAWINGS

Embodiments of the invention are illustrated by way of example and not by way of limitation in the figures of the accompanying drawings, in which like-references indicate similar elements. It should be noted that references to "an" or "one" embodiment in this disclosure are not necessarily to the same embodiment, and such references mean "at least one."

DETAILED DESCRIPTION

Figure 1:
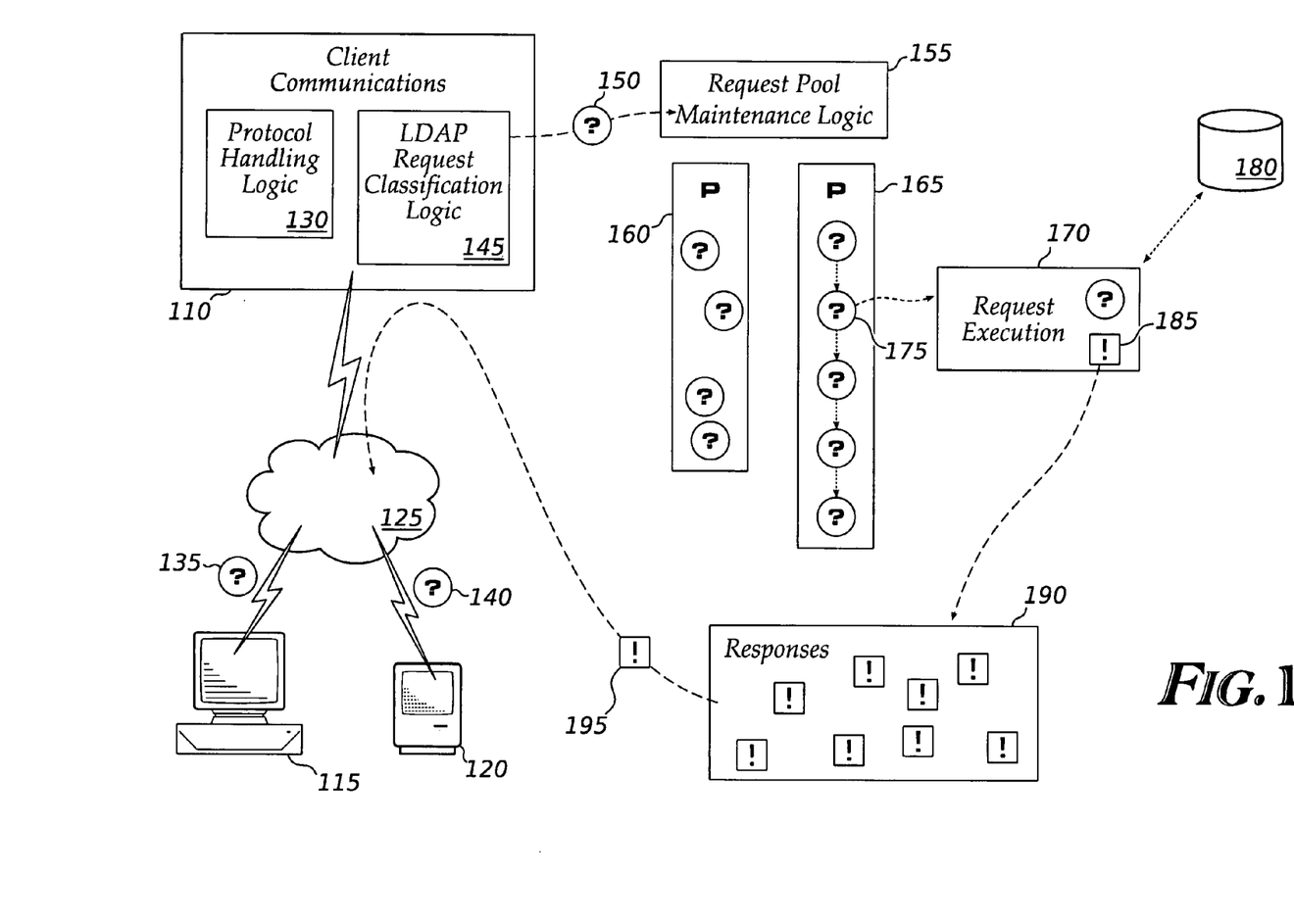
FIG. 1 shows an overview of logical blocks of an LDAP server according to an embodiment, and some interactions between the LDAP server and its clients.

FIG. 1 shows logical subsystems of an LDAP server that implements an embodiment of the invention. A client communication module 110 accepts connections from, and communicates with, LDAP clients 115 and 120 over a distributed data network 125 such as the Internet. Client communication module 110 includes protocol handling logic 130 so that it can carry on conversations according to the LDAP protocol. Clients issue LDAP requests 135, 140, which are received by the LDAP server. LDAP request classification logic 145 within the client communication module 110 classifies a request 150 based on criteria described below, then passes it to request pool maintenance logic 155 to be held with similarly-classified requests in pools 160, 165. (In some embodiments, requests may be identified by class but held altogether in a single pool; in this arrangement, request pool maintenance logic should provide a mechanism for a request of a predetermined class to be extracted from the pool.) Classified LDAP requests may be placed in a pool without any ordering policy, as shown at 160; or in a pool with an ordering policy such as first-in, first-out ("FIFO") or last-in, first-out ("LIFO"). In one embodiment, LDAP requests of a class may be prioritized and stored together on a priority queue.

Request execution logic 170 retrieves an LDAP request 175 of a predetermined class from a pool of requests of that class 165 and executes the request by interacting with database 180. Request execution logic 170 may read and write data directly from/to a mass storage device, or may use database interface logic (not shown) to issue commands to and interpret results from an external database. An appropriate LDAP response 185 is prepared and returned to response pool 190. Eventually, an LDAP response 195 is removed from response pool 190 by client communication module 110 and returned to the corresponding client, as indicated by the dashed arrow.

Figure 2:
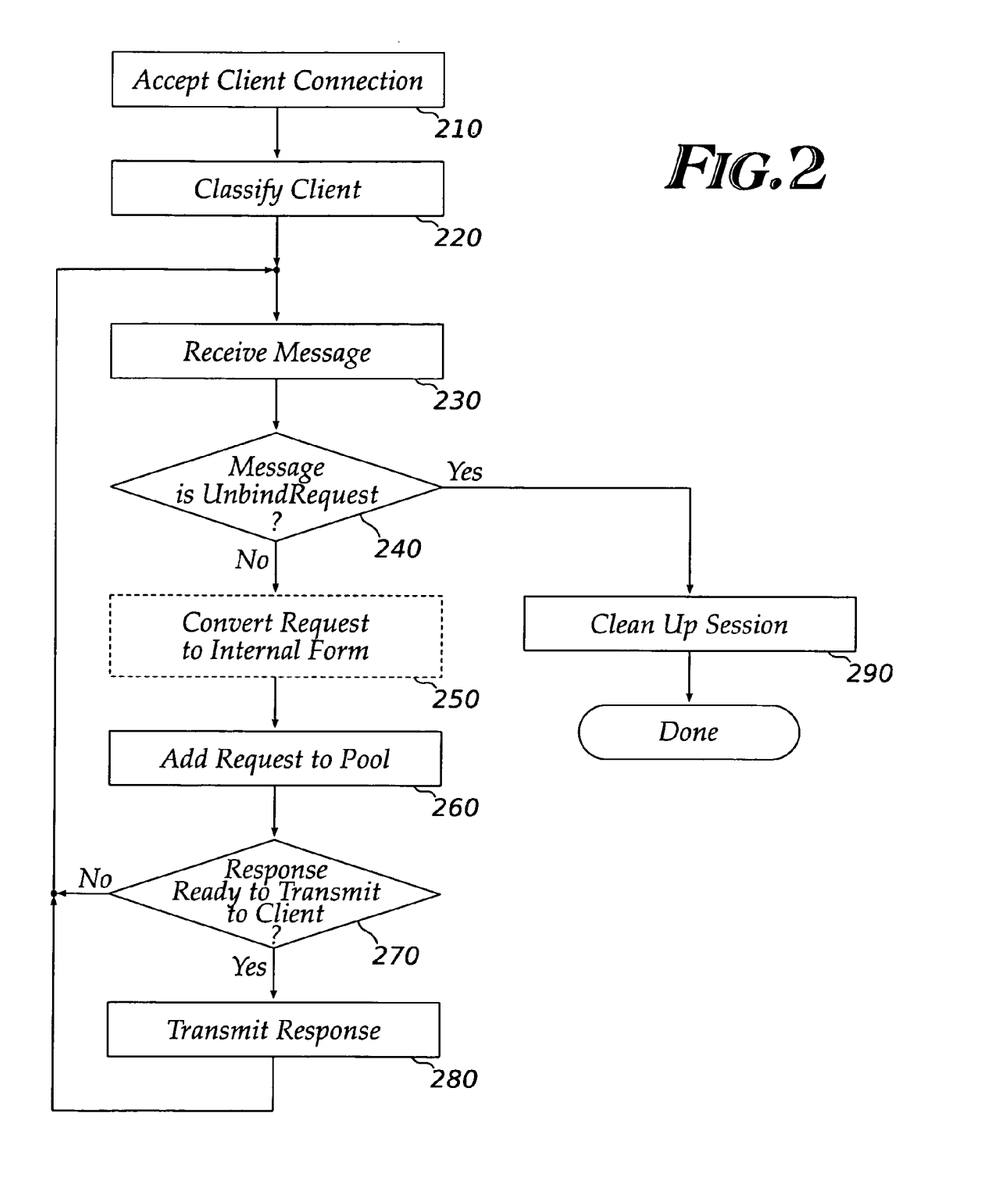
FIG. 2 is a flow chart of the client-interaction portion of an embodiment.

FIG. 2 is a flow chart illustrating a flow of the client communication module shown as element 110 in FIG. 1. At 210, a connection from a client is accepted. The connection may be made over any stream-oriented lower-level data communication protocol, such the Transmission Control Protocol ("TCP") or the encrypted Secure Socket Layer ("SSL") protocol. At 220, the client is classified according to criteria described below.

Since an LDAP client may send multiple requests during a session, subsequent client interaction operations occur in a loop. At 230, a message from the client is received. If the message is an LDAP "UnbindRequest" message (240), the client is indicating that it wishes to terminate the session. The client communication module (and possibly other portions of the LDAP server) dean up the session (290) by releasing data structures and other resources used to serve the client, discarding any unsent responses for the client, logging performance data, dosing the network connection and so on. A client can also simply disconnect (perhaps due to network trouble); this can be treated similarly to an "UnbindRequest" message.

If the message is not an "UnbindRequest" message, the message may optionally be converted to an internal form (250) (for example, to a data structure containing information such as the identity of the client, the class of the client and/or request, the time the request was received, and so on). At 260, the LDAP request is placed in a pool, set, queue, or similar data structure with other requests of the same class, or in a data structure from which requests can be selected and removed by class. At 270, the client communication module checks to see whether there is a response ready to transmit to the client and, if there is, the response is transmitted (280). Finally, the client service loop repeats.

The client communication module's message-receiving functions and response-transmitting functions need not be performed in precisely the order shown in this flow chart. Those of skill in the art will recognize that if operation 230 blocks (i.e. if program or thread operation pauses until a message is received) then any responses generated may not be transmitted timely. Therefore, a practical implementation may separate the receiving and transmitting functions and execute them in parallel, use non-blocking input/output ("I/O") functions, or adopt some similar strategy to facilitate efficient and timely bidirectional client communications.

Figure 3:
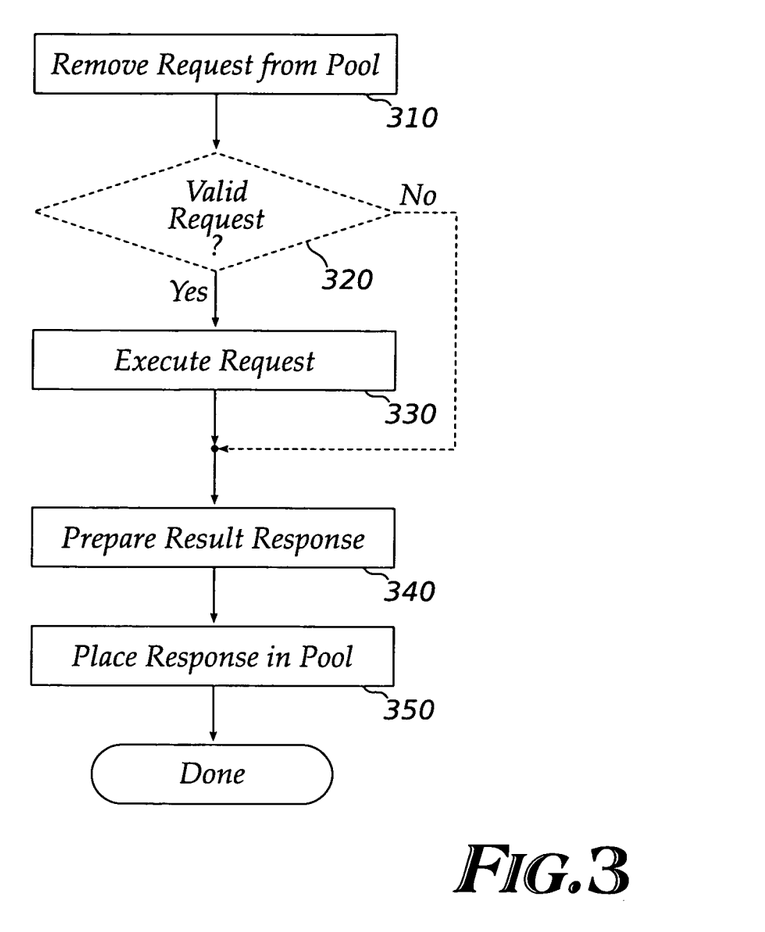
FIG. 3 is a flow chart of the request-processing portion of an embodiment.

FIG. 3 is a flow chart illustrating a flow of the request execution portion of the LDAP server. This portion services LDAP clients' requests that have been classified and placed in a request pool by the client communications logic. At block 310, a request of a particular class is removed from its pool. (The pool may contain only one class of LDAP requests, or the desired class of request may be specified to select a request from a pool containing multiple classes.) As mentioned above, pools may be ordered or unordered, so requests within a class may be selected for processing in the order they were received, in the reverse of the order they were received, in a prioritized order regardless of the order they were received, or in a random order.

The request may optionally be checked for validity (320, shown in phantom) before execution. For example, a request to alter database contents may be checked to ensure that appropriate client validation has occurred, and a request from a client that disconnected before the request was selected for execution may be discarded. In some embodiments, validity checks can be performed by the client communications logic, relieving the execution logic of this task.

If the request is valid, it is executed by, for example, searching the database to find matching records or updating a record in the database to contain new information (330). The LDAP server may manage the database itself, reading and writing directly from mass storage devices; or it may prepare and execute database operations using a different database access mechanism such as a Structured Query Language ("SQL") query.

At block 340, a response is prepared. The response may contain records found by a search, a "success" or "failure" indicator of a database modification, or some other message to apprise the client of the outcome of its request. The response is placed in a response pool for eventual transmission back to the requesting client (350). Although FIG. 3 shows the process ending here, a practical LDAP server could repeat these operations in a loop to serve more requests from the pool.

Note that passing requests from the client communications logic to the request execution logic via the classified pool(s) as shown and described in relation to FIGS. 1-3 permits the communication tasks to be decoupled from the request execution logic. This is in contrast to simple, prior art network servers, where a single thread of execution dedicated to each client performs all the work in sequence: receiving a request, executing the request, and returning any response, before beginning to work on the client's next request. Decoupling communication from execution via a priority queue lets the LDAP server developer and/or administrator exercise more control over the server's operations by adjusting the resources available to serve various classes of requests.

Separation of LDAP server functions along the lines described and depicted above (i.e. client communication functions and request execution functions) can facilitate efficient use of modern multiprocessing hardware and multi-threaded execution environments. A first group of threads can be launched to perform client communication tasks: accepting new client connections; encrypting and decrypting messages if Secure Sockets Layer ("SSL") communications are in use; receiving LDAP queries and "unpacking" the query elements from their serialized transmission form; validating that messages are in the correct form; assigning priorities and enqueueing the requests; and "packing," possibly encrypting, and transmitting responses.

A second group of threads can be launched to perform database-related tasks such as locating records that match a query, updating records with new information, and constructing responses containing requested information. The second group of threads can be subdivided into sub-groups of threads dedicated to serving each class of request. For example, if there are ten threads for serving LDAP requests and three are dedicated to serving a first class of request, while the remaining seven serve a second class of request, then (assuming an unbiased thread scheduling policy) approximately thirty percent of the LDAP server's capacity will be available to serve requests of the first class, even when there is a backlog of requests of the second class.

The connection between the client communications and request execution groups of threads is the classified pool system for inbound requests, and the response pool for outbound replies. Requests from clients are classified and placed in pools by the client communication threads, and selected and executed by the request execution threads. In some embodiments, the communication threads and the execution threads may run on separate programmable processors in a system, on separate virtual machine environments hosted by a system, or on completely separate systems. In some of these situations, the request pool(s) and response pool may be implemented as distributed data structures.

LDAP requests may be classified by a number of different criteria (or by combinations of these and other criteria). One useful criterion is the network address of the LDAP client from which the request was received. The structure of network addresses of the widely-used Internet Protocol ("IP") permits a useful variation of this classification method: by classifying based on some of the most-significant bits of an IP address, requests from a logically (and often geographically) similar group of computers can be classified together.

Since the LDAP protocol includes an authentication mechanism, LDAP requests can also be classified based on the identity of the LDAP client. All the LDAP-using applications at a particular computer may be configured to use the same LDAP identity, or the LDAP identity may be linked to the particular kind of application sending the LDAP requests. In some embodiments, the LDAP server operator may offer a guaranteed level of service to certain clients, and special authentication credentials can be established to identify clients entitled to that level of service. An LDAP request that does not fit any other criteria in use by the server may be classified in a catch-all, "anonymous" class. The load on the system from anonymous LDAP requests can be limited by dedicating only a small number of threads to serve the anonymous class.

In a preferred embodiment, an "administrative" class is used to serve LDAP requests from an administrator or manager of the LDAP server. By dedicating several threads to the administrative class, the administrator can be sure of obtaining responses to LDAP requests even when the server is overwhelmed with requests that fall into other classes.

The foregoing request classification techniques operate on a per-client basis. That is, all the requests from a given client will be placed in the same class. However, per-request classification can also be used. For example, requests to query the database can be placed in a first class, and requests to modify the database can be placed in a second class. This can help ensure that one of the two types of operation (query and modify) does not monopolize the server's processing resources to the exclusion of the other type of operation, even if vastly more requests of one type are received. LDAP requests may contain attributes (as described in the LDAP specification), and these attributes may also be used to direct requests to particular classes of service. Individual requests can be examined to produce an estimate of the computational complexity of performing the request. For example, a database search query that involves multiple wildcards may be more expensive (in terms of memory and processing resources) to perform than a search that simply requests a record identified by the record's Distinguished Name ("DN"). Lower-cost queries may be placed together in one service class, and higher-cost queries placed together in another class. The estimated complexity at which a request is deemed "expensive" may be adjusted to further tune the server's operation.

If a request pool is prioritized, the prioritization criteria can be selected to achieve finer-grained control over LDAP execution performance. For example, requests from clients of a class that connect from a preselected range of network addresses can be given increased priority. This can improve the LDAP query responsiveness for those clients over and above other clients that are classified in the same class. Clients of the same class that use (or do not use) SSL may be favored, or clients that present certain authentication credentials can be given preferential service, despite being in the same class as other authenticated clients.

The client communication logic can also examine requests individually and prioritize the requests within a class based on an estimate of the computational complexity of performing the request. Thus, even within a class of requests of similar complexity (as discussed above), less-complex requests may receive higher priority than more-complex requests. This can help ensure that expensive, long-running queries do not monopolize the server resources allotted to a class.

Figure 4:
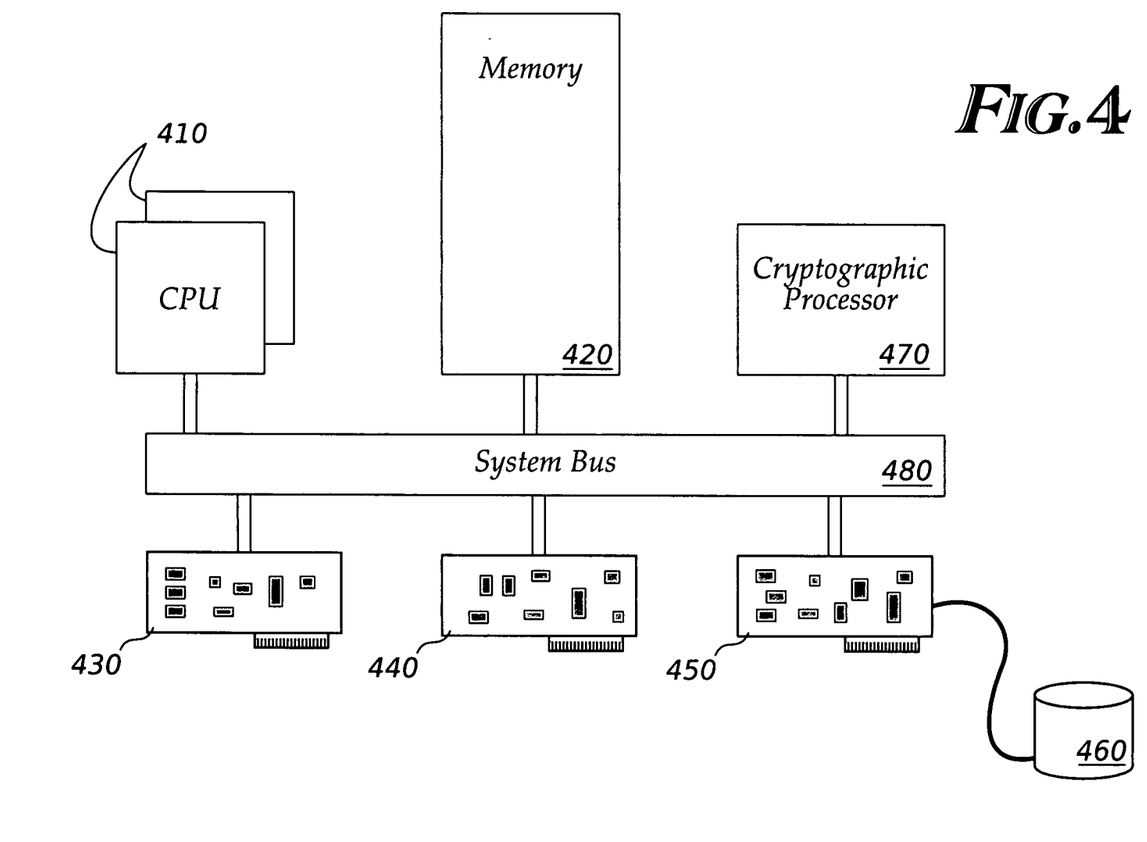
FIG. 4 is a block diagram of a system that implements an embodiment of the invention.

FIG. 4 shows a block diagram of a computer system that can support an embodiment of the invention. Programmable processors (identified as Central Processing Units or "CPUs") 410 execute instructions contained in a memory 420. The instructions cause the processors to perform operations as described above. Communication with LDAP clients occurs through network interfaces 430 and 440. Mass storage interface 450 permits the system to read and write data on mass storage device 460. This data may include the LDAP data from which client requests are satisfied. Some systems may include a hardware cryptographic processor 470 to accelerate encryption and decryption of SSL-protected client messages. The system components described and shown in FIG. 4 are connected to, and communicate over, system bus 480.

The particular methods of the invention have been described in terms of software with reference to a series of flowcharts. The methods to be performed by a computer or machine constitute programs made up of machine-executable instructions illustrated as blocks (acts). Describing the methods by reference to a flowchart enables one skilled in the art to develop such programs including such instructions to carry out the methods on suitably configured machines (the processing unit of the machine executing the instructions from machine-readable media). The machine-executable instructions may be written in a computer programming language or may be embodied in firmware logic. If written in a programming language conforming to a recognized standard, such instructions can be executed on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g. program, procedure, process, application, module, logic), as taking an action or causing a result. Such expressions are merely a shorthand way of saying that execution of the software by a machine causes the processor of the machine to perform an action or to produce a result. It will be appreciated that more or fewer processes may be incorporated into the methods as described above without departing from the scope of the invention, and that no particular order is implied by the arrangement of blocks shown and described herein.

An embodiment of the invention may be a machine-readable medium having stored thereon instructions to cause a programmable processor to perform operations as described above. The instructions may be directly executable by a programmable processor, or they may be in a "source code" form that can be compiled into executable instructions to control a programmable processor. In other embodiments, the operations might be performed by specific hardware components that contain hardwired logic. Those operations might alternatively be performed by any combination of programmed computer components and custom hardware components.

A machine-readable medium may include any mechanism for storing or transmitting information in a form readable by a machine (e.g. A computer), including but not limited to Compact Disc Read-Only Memory ("CD-ROM"), Read-Only Memory ("ROM"), Random Access Memory ("RAM"), and Erasable Programmable Read-Only Memory ("EPROM").

The applications of the present invention have been described largely by reference to specific examples and in terms of particular allocations of functionality to certain hardware and/or software components. However, those of skill in the art will recognize that Lightweight Directory Access Protocol ("LDAP") service can also be provided efficiently by software and hardware that distribute the functions of embodiments of this invention differently than herein described. Such variations and implementations are understood to be captured according to the following claims.

The invention claimed is:

1. A computerized method comprising:
classifying, by a Lightweight Directory Access Protocol ("LDAP") server computer system, a plurality of LDAP requests associated with a plurality of LDAP clients into a plurality of classes based, at least in part, on operation types of the plurality of LDAP requests to produce a pool of classified LDAP requests, each of the plurality of classes having LDAP requests requesting performance of operations of a distinct type of the operation types;
maintaining a plurality of threads to execute the plurality of LDAP requests, wherein LDAP requests of a first class are executed by a first group of threads, and LDAP requests of a second class are executed by a second group of threads;
upon receiving a first LDAP request of the first class from a first LDAP client, storing, by the LDAP server computer system, the first LDAP request associated with the first LDAP client in the pool of classified LDAP requests in association with the LDAP requests of the first class;
selecting, by the LDAP server computer system, a second LDAP request of the first class from the pool of classified LDAP requests, the second LDAP request being associated with a second LDAP client;
executing, by the LDAP server computer system, the second LDAP request on a thread of the first group of threads associated with the first class to prepare a corresponding LDAP response for the second LDAP client; and executing, by the LDAP server computer system, the first LDAP request on the thread of the first group of threads associated with the first class to prepare a corresponding LDAP response for the first LDAP client.

2. The computerized method of claim 1 wherein classifying comprises:
assigning LDAP requests from clients within a predetermined range of network addresses to a single class.

3. The computerized method of claim 1 wherein classifying comprises:
assigning LDAP requests from clients that present predetermined authentication information to a single class.

4. The computerized method of claim 1 wherein classifying comprises:
assigning requests from clients that do not satisfy other classification criteria to a catch-all anonymous class.

5. The computerized method of claim 1 wherein selecting comprises:
selecting a highest-priority LDAP request from the pool of classified LDAP requests.

6. The computerized method of claim 1, wherein classifying comprises:
assigning LDAP requests to a class based on a type of operation of the LDAP request.

7. The computerized method of claim 1, wherein classifying comprises:
assigning LDAP requests to a class based on an LDAP attribute of the LDAP request.

8. The computerized method of claim 1, wherein classifying comprises:
assigning LDAP requests to a class based on a Distinguished Name ("DN") of the LDAP request.

9. The computerized method of claim 1, wherein classifying comprises:
assigning LDAP requests to a class based on an estimated processing cost to execute the LDAP request.

10. A system comprising:
at least one data storage device to host a Lightweight Directory Access Protocol ("LDAP") database; and
at least one processor, coupled with the data storage device, to communicate with LDAP clients, to classify a plurality of LDAP requests associated with a plurality of LDAP clients into a plurality of classes based, at least in part, on operation types of the plurality of LDAP requests, each of the plurality of classes having LDAP requests requesting performance of operations of a distinct type of the operation types, to hold a plurality of classified LDAP requests associated with the plurality of LDAP clients in a pool, to maintain a plurality of threads to execute the plurality of LDAP requests, wherein LDAP requests of a first class are executed by a first group of threads, and LDAP requests of a second class are executed by a second group of threads, to store, upon receiving a first LDAP request of a first class from a first LDAP client, the first LDAP request associated with the first LDAP client in the pool of classified LDAP requests in association with LDAP requests of the first class, to select a second LDAP request of the first class from the pool of classified LDAP requests, the second LDAP request being associated with a second LDAP client, to execute the second LDAP request on a thread of the first group of threads associated with the first class to prepare a corresponding LDAP response for the second LDAP client, and to execute the first LDAP request on the thread of the first group of threads associated with the first class to prepare a corresponding LDAP response for the first LDAP client.

11. The system of claim 10 wherein the processor is to classify an LDAP request based on a network address from which the LDAP request was received.

12. The system of claim 10 wherein the processor is to classify an LDAP request based on LDAP authentication information from an LDAP client.

13. The system of claim 10 wherein one of the plurality of classes is a catch-all anonymous class.

14. The system of claim 10 wherein the processor is to classify an LDAP request based on a type of the LDAP request.

15. The system of claim 10 wherein the processor is to estimate a computational complexity of the LDAP request, and to hold the plurality of classified LDAP requests in a prioritized order.

16. A non-transitory machine-readable storage medium containing executable instructions to cause a Lightweight Directory Access Protocol ("LDAP") server computer system to perform operations comprising:
classifying, by the LDAP server computer system, a plurality of LDAP requests associated with a plurality of LDAP clients into a plurality of classes based, at least in part, on operation types of the plurality of LDAP requests to produce a pool of classified LDAP requests, each of the plurality of classes having LDAP requests requesting performance of operations of a distinct type of the operation types;
maintaining a plurality of threads to execute the plurality of LDAP requests, wherein LDAP requests of a first class are executed by a first group of threads, and LDAP requests of a second class are executed by a second group of threads;
upon receiving a first LDAP request of the first class from a first LDAP client, storing, by the LDAP server computer system, the first LDAP request associated with the first LDAP client in the pool of classified LDAP requests in association with the LDAP requests of the first class;
selecting, by the LDAP server computer system, a second LDAP request of the first class from the pool of classified LDAP requests, the second LDAP request being associated with a second LDAP client;
executing, by the LDAP server computer system, the second LDAP request on a thread of the first group of threads associated with the first class to prepare a corresponding LDAP response for the second LDAP client; and
executing, by the LDAP server computer system, the first LDAP request on the thread of the first group of threads associated with the first class to prepare a corresponding LDAP response for the first LDAP client.

17. The non-transitory machine-readable storage medium of claim 16 wherein classifying comprises:
assigning LDAP requests from clients within a predetermined range of network addresses to a single class.

18. The non-transitory machine-readable storage medium of claim 16 wherein classifying comprises:
assigning LDAP requests from clients that present predetermined authentication information to a single class.

19. The non-transitory machine-readable storage medium of claim 16 wherein classifying comprises:
assigning requests from clients that do not satisfy other classification criteria to a catch-all anonymous class.

20. The non-transitory machine-readable storage medium of claim 16 wherein selecting comprises:

selecting a highest-priority classified LDAP request from the pool of classified LDAP requests.

* * * * *